(12) United States Patent
Shimoji et al.

(10) Patent No.: US 6,352,375 B1
(45) Date of Patent: Mar. 5, 2002

(54) CONNECTOR ADAPTER

(75) Inventors: Naoko Shimoji, Funabashi; Masato Shiino, Ichihara; Masayuki Iwase, Ichihara; Hajime Mori, Ichihara, all of (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/539,866

(22) Filed: Mar. 31, 2000

(30) Foreign Application Priority Data

Apr. 2, 1999 (JP) .......................................... 11-096255

(51) Int. Cl.[7] ................................................ G02B 6/36
(52) U.S. Cl. ........................................ 385/92; 385/139
(58) Field of Search ........................... 385/92, 139, 901, 385/88

(56) References Cited

U.S. PATENT DOCUMENTS 6,081,647 A * 6/2000 Roth et al.
6,108,482 A * 8/2000 Roth
6,296,398 B1 * 10/2001 Lu

* cited by examiner

Primary Examiner—Hung N. Ngo
(74) Attorney, Agent, or Firm—Oblon, Spivak, McClelland, Maier & Neustadt, P.C.

(57) ABSTRACT

A connector adapter including a light emitting element for emitting a laser beam and connected with a plug having an optical fiber, whereby the laser beam emitted from the light emitting element is introued into the optical fiber. The connector adapter comprises a shutter member fixed in a connector and including a base portion having a first spring portion and a shutter portion connected to the base portion. The base portion undergoes elastic deformation at the first spring portion so that the shutter portion recedes from the optical path of the laser beam when the plug is pushed into the adapter to be attached thereto, and is restored from the elastic deformation so that the shutter portion intercepts the optical path of the laser beam when the plug is drawn out of the adapter to be detached therefrom.

6 Claims, 8 Drawing Sheets

CONNECTOR ADAPTER

BACKGROUND OF THE INVENTION

1. Field of the Invention

The present invention relates to a connector adapter having therein a light emitting element for emitting laser beams.

2. Description of the Related Art

In operating a connector adapter that has therein a light emitting element for emitting laser beams, an operator's eyes may possibly be pathologically damaged by the laser beams from the light emitting element in an active state as s/he carelessly allows the beams to meet the eyes directly while attaching to or detaching a corresponding single- or multifiber connector from the adapter.

In order to prevent the eyes from being thus damaged by the laser beams, it is advisable to interrupt the operation of the light emitting element by means of an internal electronic circuit, thereby stopping the emission of the laser beams, or to intercept the laser beams mechanically.

Interrupting the operation of the light emitting element by means of the internal electronic circuit to stop the emission of the laser beams, however, requires a large-scale device configuration and inevitably entails an increase in cost. Therefore, it is more advisable to provide means for mechanically intercepting the laser beams.

SUMMARY OF THE INVENTION

The object of the present invention is to provide a connector adapter having therein a light emitting element for emitting laser beams and including means for mechanically intercepting the laser beams when a plug is not attached thereto.

In order to achieve the above object, according to the present invention, there is provided a connector adapter including a light emitting element for emitting a laser beam and connected with a plug having an optical fiber, whereby the laser beam emitted from the light emitting element is introduced into the optical fiber, comprising a shutter member fixed in a connector and including a base portion having a first spring portion and a shutter portion connected to the base portion, the base portion being adapted to undergo elastic deformation at the first spring portion so that the shutter portion recedes from the optical path of the laser beam when the plug is pushed into the adapter to be attached thereto, and adapted to be restored from the elastic deformation so that the shutter portion intercepts the optical path of the laser beam when the plug is drawn out of the adapter to be detached therefrom.

Preferably, a second spring portion is formed at the junction of the base portion and the shutter portion.

Preferably, moreover, a recess or opening is provided for holding a part of the shutter member when the plug is attached to the connector adapter.

In first and second aspects of the invention, there may be provided a safe connector adapter that has therein the light emitting element for emitting the laser beam and includes the means for mechanically intercepting the laser beam when the plug is not attached.

In third and fourth aspects of the invention, the shutter member more easily undergoes elastic deformation at the first spring portion of the base portion.

The above and other objects, features, and advantages of the invention will be more apparent from the ensuing detailed description taken in connection with the accompanying drawings.

DETAILED DESCRIPTION OF THE PREFERRED EMBODIMENTS

One embodiment of the present invention will now be described in detail with reference to the accompanying drawings of FIGS. 1 to 13.

Figure 1:
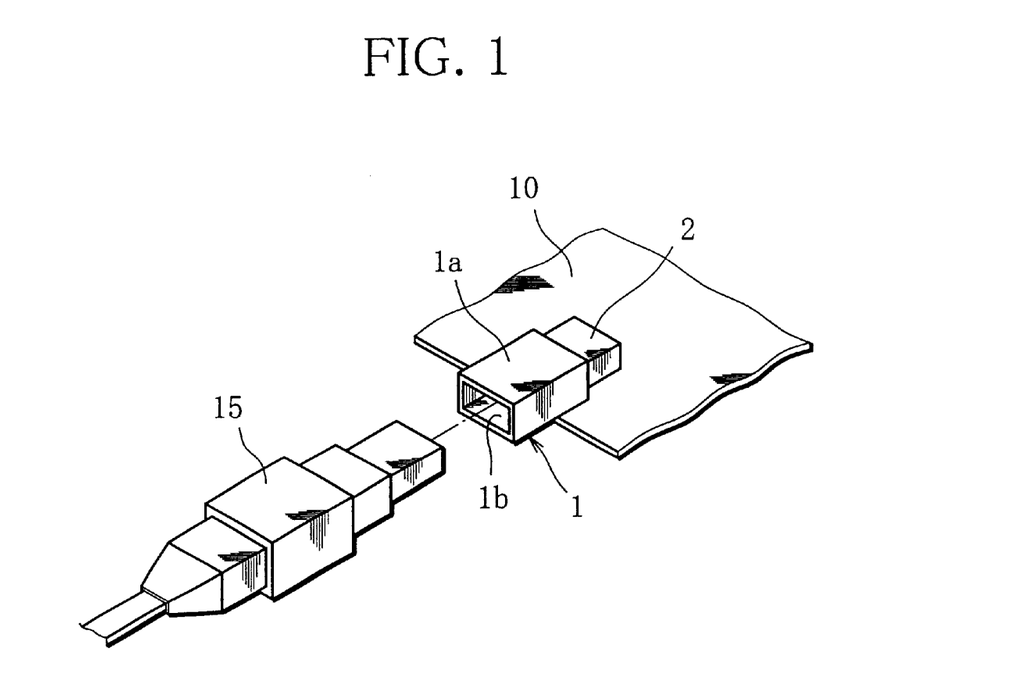
FIG. 1 is a perspective view showing the way an adapter according to the present invention to be used is mounted on a support member.

As shown in FIG. 1, a connector adapter (hereinafter referred to simply as "adapter") 1 comprises a light emitting element 2 that is attached to its rear part. The light emitting element 2 is supported by means of an end portion of a support member, e.g., a substrate 10, and is fitted with a plug having optical fibers, e.g., an optical connector 15. Laser beams emitted from the light emitting element 2 can be introdued into the optical fibers.

As shown in FIGS. 1 to 6, the adapter 1 has a socket 1b for the optical connector 15 in the front part of its housing 1a, and the light emitting element 2 is attached to the rear part of the interior of the housing 1a with the aid of a sleeve 3. The socket 1b is formed in a manner such that the respective optic axes the optical fibers of the optical connector 15 and emitting portions 2b (mentioned later) of the element 2 are in alignment with each other when the connector 15 is attached to the adapter 1.

Figure 4:
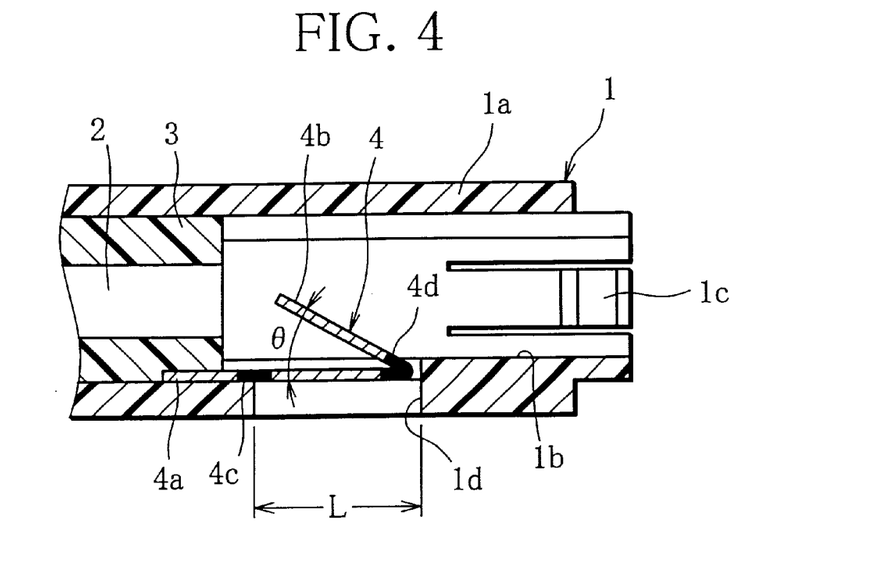
FIG. 4 is a sectional view of the adapter taken along line B—B of FIG. 2.

As shown in FIG. 4, moreover, positioning arms 1c for positioning the optical connector 15 to be fitted into the socket 1b with reference to the crosswise direction are provided individually on the opposite sides of the housing 1a, and an opening 1d is formed in the bottom portion of the housing. As shown in FIG. 4, the housing 1a is provided with a shutter 4 in its opening 1d. An end portion of a base portion 4a (mentioned later) of the shutter 4 is held between the bottom portion of the housing 1a and the sleeve 3.

Figure 5:
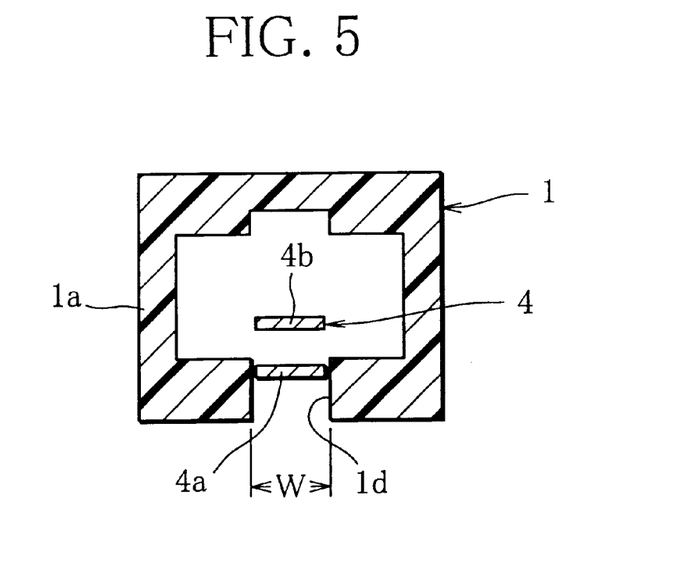
FIG. 5 is a sectional view taken along line C—C of FIG. 3.
Figure 6:
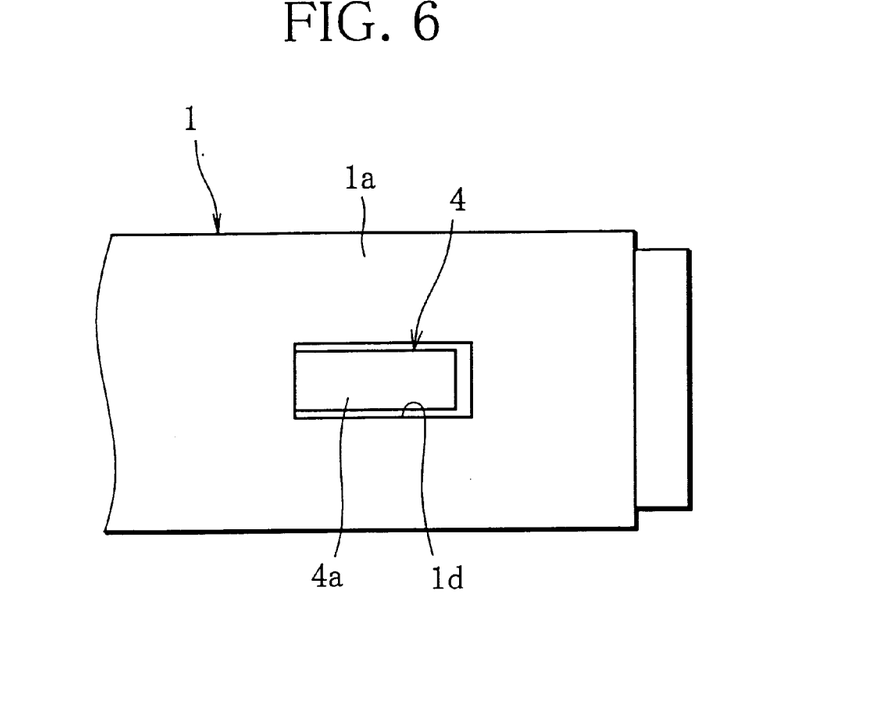
FIG. 6 is a bottom view of the adapter of FIG. 2.

The opening 1d is formed so that its length L shown in FIG. 4 in the loading direction of the optical connector 15 is greater than a length Ls (see FIG. 9) between the center of a first spring portion 4c (mentioned later) of the shutter 4 and an end portion of a second spring portion 4d (L>Ls) and that its width W is a little greater than the width of the shutter 4, as shown in FIG. 5. Thus, when the shutter 4 undergoes elastic deformation at its first spring portion 4c, the opening 1d serves as an evacuation space for the base portion 4a.

The optical connector 15 to be attached to the adapter 1 may be, for example, a multifiber connector having a plurality of optical fibers, such as a so-called MPO connector or MT connector, a series connector including singlefiber connectors with single optical fibers, a singlefiber connector having a single optical fiber, such as a so-called SC connector.

Figure 2:
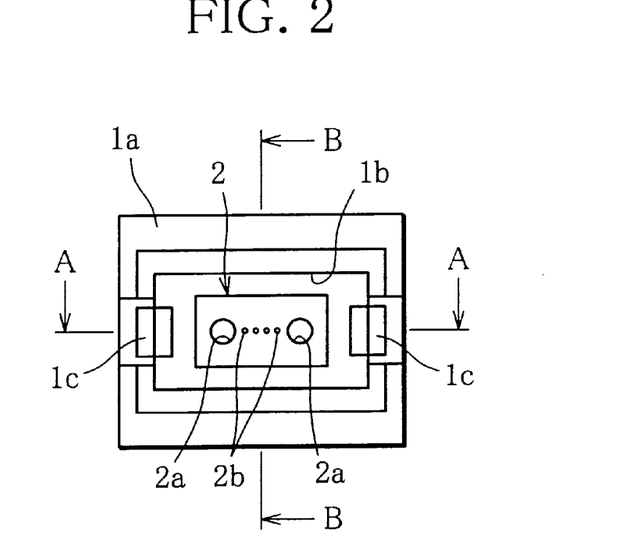
FIG. 2 is a front view of the adapter of the invention.
Figure 3:
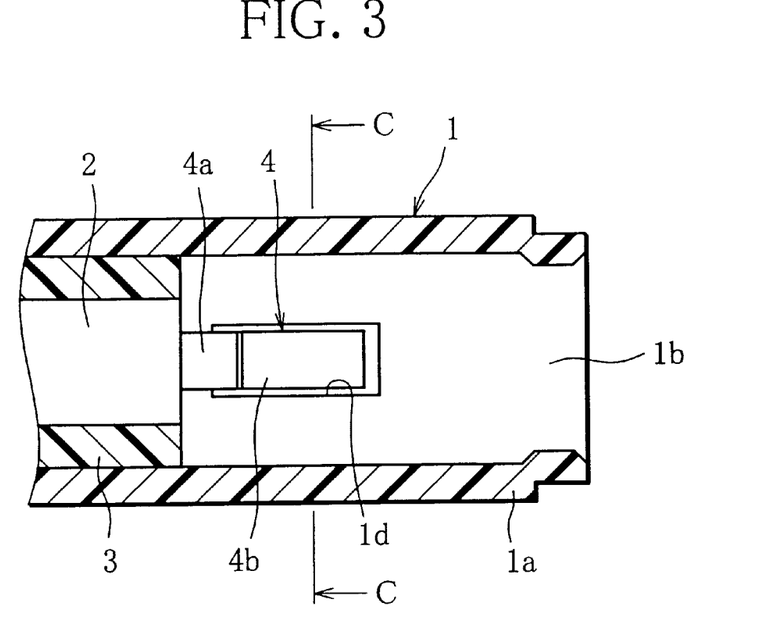
FIG. 3 is a sectional view of the adapter taken along line A—A of FIG. 2.

The light emitting element 2 is an element for emitting laser beams, and may be used of an LD module, for example. On the opposite sides of the light emitting element 2, as shown in FIG. 2, guide pin holes 2a for connection with the optical connector 15 are formed in the direction of connection with the connector 15. A plurality of emitting portions 2b for emitting laser beams are arranged between the two holes 2a.

Figure 9:
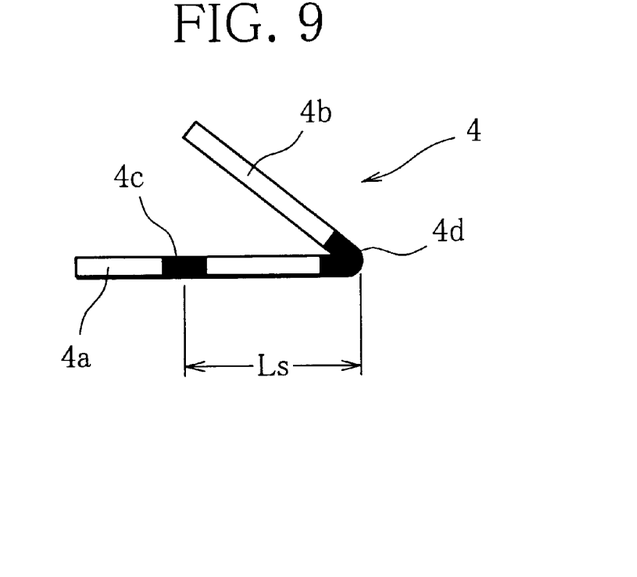
FIG. 9 is a side view of a shutter used in the adapter of FIG. 2.

The shutter 4 is a laser beam interceptor that serves to prevent an operator's eyes from being damaged by laser beams emitted from the emitting portions 2b of the light emitting element 2 as s/he allows the laser beams to meet the eyes directly while attaching to or detaching the optical connector 15 from the adapter 1. As shown in FIGS. 4 and 9, the shutter 4 is a wedge-shaped structure, which is formed of a springy or elastic material, e.g., superelastic metal such as nickel-titanium alloy. The shutter 4 includes the base portion 4a and a shutter portion 4b. The first and second spring portion 4c and 4d are formed in the base portion 4a and at the junction of the base portion 4a and the shutter portion 4b, respectively.

The shutter 4, which is located in the adapter 1, is designed so that the upper end of the shutter portion 4b is situated above the emitting portions 2b of the light emitting element 2 and that the emitting portions 2b are situated within the width of the shutter portion 4b when the optical connector 15 is not fitted in the socket 1b of the adapter 1. In this state, the shutter portion 4b intercepts the optical path $P_L$ (see FIG. 7A) of each of the laser beams emitted from the emitting portions 2b. Further, the shutter 4 is designed so that an angle θ formed between the base portion 4a and the shutter portion 4b is θ=20 to 45°, as shown in FIG. 4, whereby the second spring portion 4d can apply a proper spring force to the shutter portion 4b when the optical connector 15 is attached to or detached from the socket 1b.

When the optical connector 15 is not attached to the adapter 1 constructed in this manner, the respective optical paths of the laser beams emitted from the emitting portions 2b of the light emitting element 2 are intercepted by the shutter portion 4b in the adapter 1. Accordingly, the operator can safely use the adapter 1, permitted to look into it through the socket 1b without allowing the laser beams from the emitting portions 2b to meet directly and damage the eyes.

The optical connector 15 is attached to the socket 1b of the adapter 1 in the following manner, whereupon the emitting portions 2b of the light emitting element 2 are connected optically to their corresponding optical fibers of the optical connector 15.

Figure 7A:
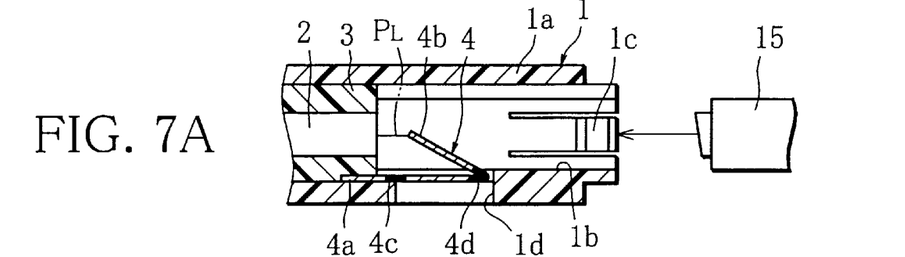
FIGS. 7A to 7E are flow diagrams illustrating the way an optical connector is attached to the adapter of FIG. 2.

First, the optical connector 15 is opposed to the socket 1b of the adapter 1, as shown in FIG. 7A.

Figure 7B:
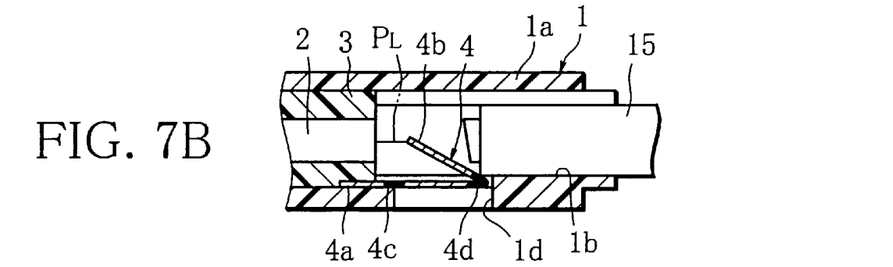

Then, the optical connector 15 is attached to and pushed into the socket 1b. When the connector 15 is thus pushed in and moved to the position of the opening 1d, its lower front part engages the shutter portion 4b near the second spring portion 4d, as shown in FIG. 7B. In this state, the optical paths $P_L$ of the laser beams from the emitting portions 2b are intercepted in the adapter 1, as shown in FIG. 7B.

Figure 7C:
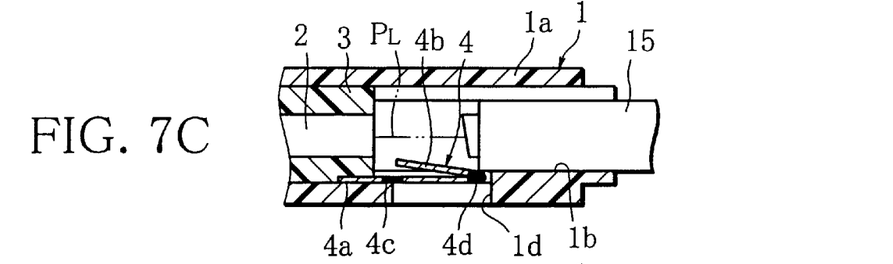

Subsequently, when the optical connector 15 is further pushed into the socket 1b from the position shown in FIG. 7B, the optical connector 15 engages the shutter portion 4b so that the shutter portion 4b is fallen down around the second spring portion 4d, as shown in FIG. 7C. Finally, the shutter portion 4b recedes from the optical paths $P_L$ of the laser beams from the emitting portions 2b. Thereupon, the optical paths $P_L$ of the laser beams are released from the interception by means of the shutter 4 in the adapter 1.

Figure 7D:
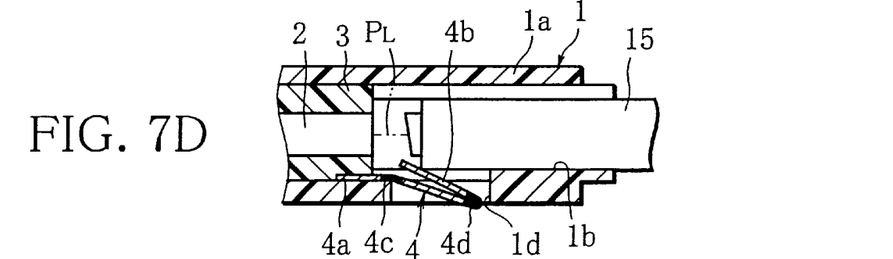

When the optical connector 15 is further pushed into the socket 1b from the position shown in FIG. 7C, the base portion 4a of the shutter 4 is caused elastically to bend into the opening 1d at the edge portion of thereof, that is, at the first spring portion 4c, as shown in FIG. 7D, by a force of pressure from the optical connector 15.

Figure 7E:
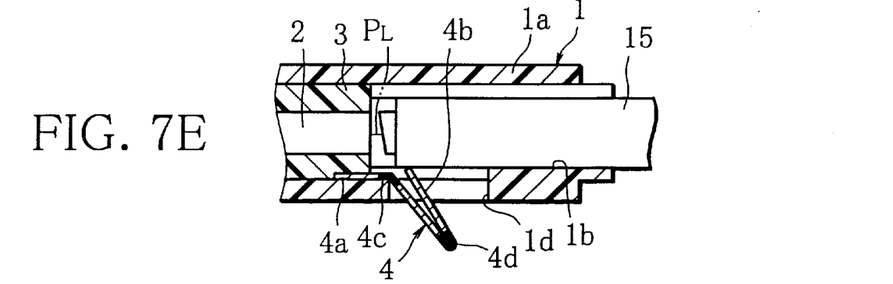

When the insertion of the optical connector 15 into the socket 1b of the adapter 1 is finished in this manner, the base portion 4a further bends into the opening 1d at the first spring portion 4c in the adapter 1, as shown in FIG. 7E, and the emitting portions 2b of the light emitting element 2 are connected optically to their corresponding optical fibers of the connector 15. Thus, the optic axes of the emitting portions 2b are aligned individually with those of their corresponding optical fibers of the optical connector 15.

As this is done, the shutter portion 4b of the shutter 4 first elastically bends in two stages into the opening 1d at the second spring portion 4d. Then, the base portion 4a bends in the same manner at the first spring portion 4c. Therefore, no excessive bending stress acts on the first and second spring portions 4c and 4d of the shutter 4, so that the spring portions 4c and 4d never undergo any permanent set in metal fatigue as it is called. Thus, according to the present embodiment, the shutter 4 is formed having a plurality of spring portions, so that stress that acts on the individual spring portions can be eased.

If the base portion 4a of the shutter 4 finally falls and bends into the opening 1d when the optical connector 15 is pushed into the socket 1b, the force of pressure from the optical connector 15 is eased. Although the first spring portion 4c is essential to the shutter 4 of the present embodiment, therefore, the second spring portion 4d is not. If the shutter 4 is designed so that its base portion 4a can get together with the first spring portion 4c into the opening 1d, as shown in FIG. 7E, the operator can visually ascertain that the optical connector 15 is normally pushed into the adapter 1.

Figure 13:
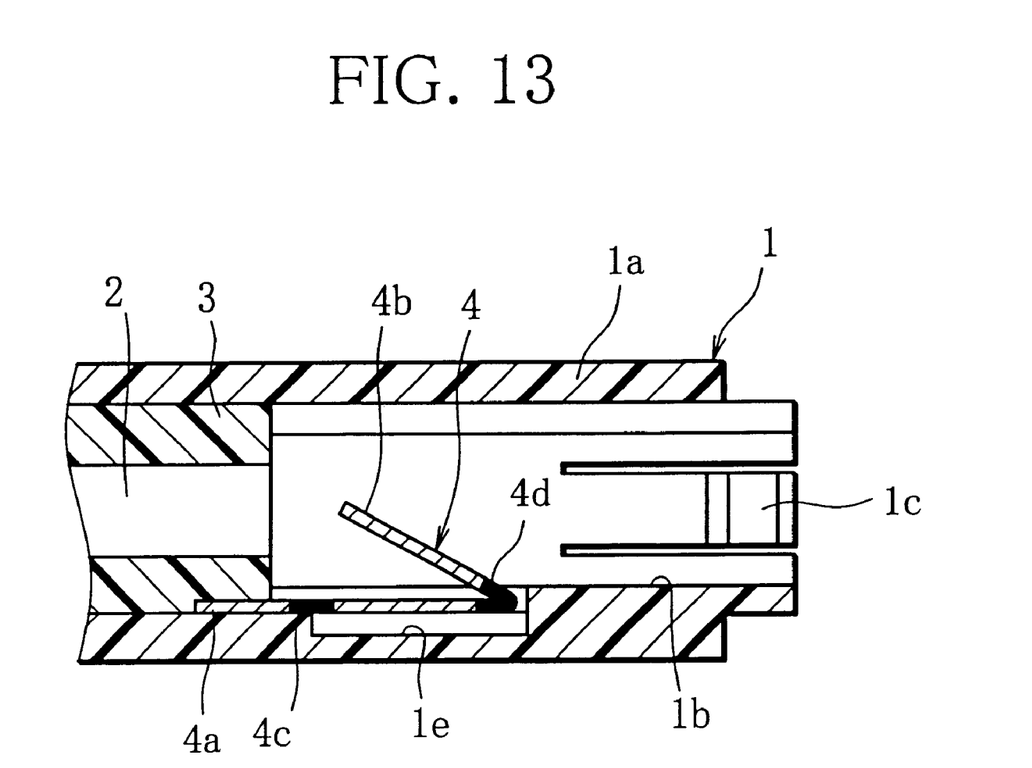
FIG. 13 is a sectional view showing a modification of the adapter of FIG. 2.

As shown in FIG. 13, moreover, the adapter 1 may be formed with a recess 1e in place of the opening 1d only if it can secure a space in which the base portion 4a can finally fall and bend.

If the optical connector 15 is drawn out of the adapter 1, on the other hand, the first and second spring portions 4c and 4d are restored from their elastically deformed state. As this is done, the shutter portion 4b returns to the position in which it intercepts the optical paths $P_L$ of the laser beams that are emitted from the emitting portions 2b of the light emitting element 2.

Figure 8A:
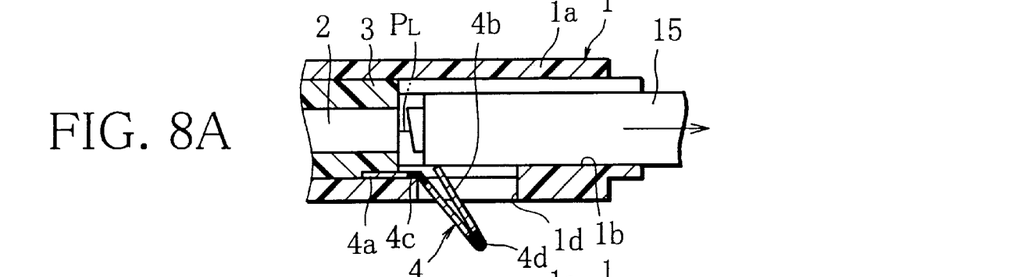
FIGS. 8A to 8E are flow diagrams illustrating the way the optical connector is drawn out of the adapter of FIG. 2.

More specifically, the optical connector 15 in the state shown in FIG. 7E is drawn out to the right from the socket 1b, as shown in FIG. 8A. As the optical connector 15 moves to the right in this manner, the shutter portion 4b elastically rocks clockwise around the second spring portion 4d and opens away from the base portion 4a. As this is done, the elastically bent state of the first spring portion 4c in the base portion 4a of the shutter 4 undergoes no substantial change.

Figure 8B:
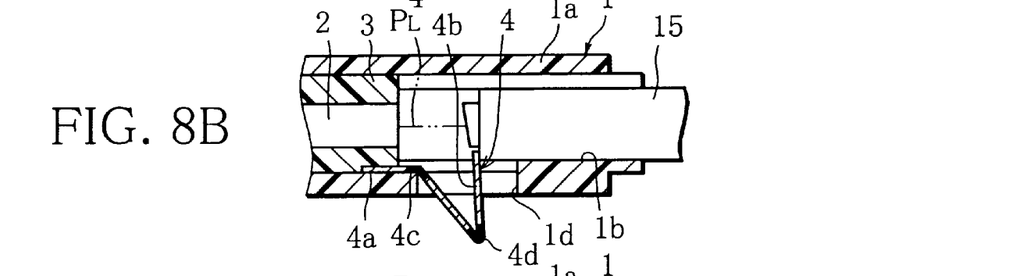

When the optical connector 15 moves to the middle portion of the opening 1d of the adapter 1, as shown in FIG. 8B, the shutter portion 4b opens away from the base portion 4a to an initial position. In this state, the distal end of the shutter portion 4b of the shutter 4 is situated near the lower front part of the optical connector 15.

Figure 8C:
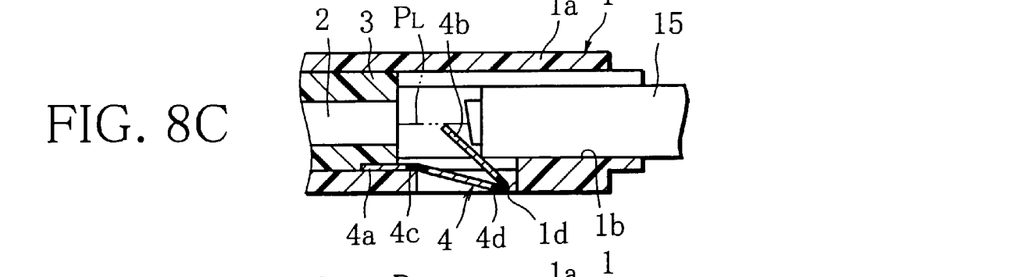

When the optical connector 15 then moves further to the right, the adapter 1 is released from the force of pressure from the connector 15, so that the base portion 4a of the shutter 4 elastically rocks counterclockwise around the first spring portion 4c. Thus, the shutter portion 4b of the shutter 4 rocks nearly to the position in which its distal end intercepts the optical paths $P_L$ of the laser beams that are emitted from the emitting portions 2b of the light emitting element 2.

Figure 8D:
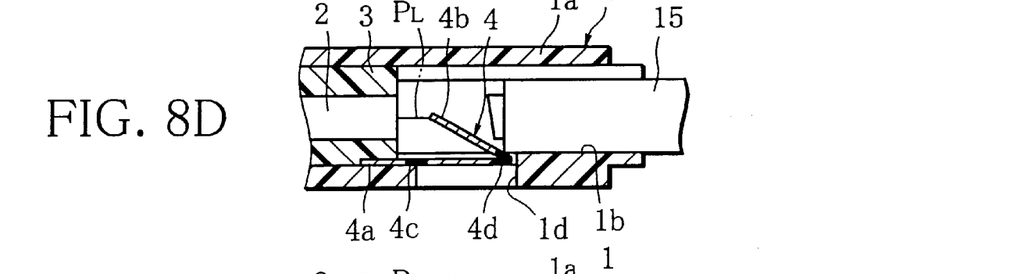

When the distal end of the optical connector 15 then moves close to the right-hand side of the opening 1d, as shown in FIG. 8D, the base portion 4a of the shutter 4 further elastically rocks counterclockwise around the first spring portion 4c to become horizontal. Thereupon, the lower front part of the optical connector 15 engages the shutter portion 4b near the second spring portion 4d, and the optical paths $P_L$ of the laser beams from the emitting portions 2b of the light emitting element 2 are intercepted by the shutter portion 4b in the adapter 1.

Figure 8E:
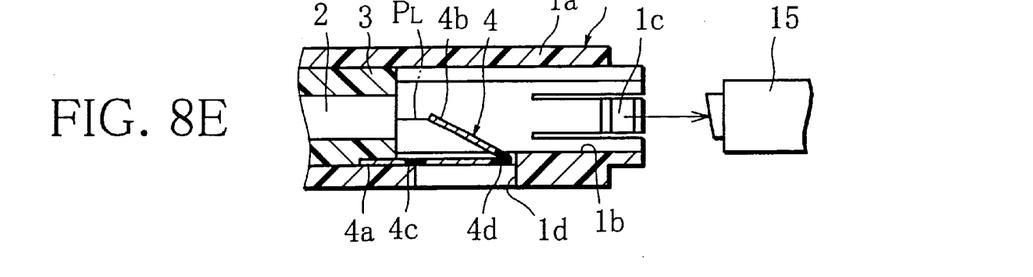

When the optical connector 15 is drawn out of the socket 1b of the adapter 1, as shown in FIG. 8E, the optical connection between the emitting portions 2b of the light emitting element 2 and their corresponding optical fibers of the optical connector 15 is canceled completely.

In this manner, the adapter 1 is attached to and detached from the optical connector 15. As this is done, the shutter portion 4b and the base portion 4a of the shutter 4 are elastically bent in two positions, that is, at the second and first spring portions 4d and 4c, respectively. Thus, no excessive bending stress acts on the first and second spring portions 4c and 4d of the shutter 4, so that the spring portions 4c and 4d are restrained from undergoing metal fatigue. If the optical connector 15 is repeatedly attached to and detached from the socket 1b, therefore, the spring properties of the shutter 4 can be maintained for a long period of time, and the laser beams emitted from the emitting portions 2b of the light emitting element 2 never leak out.

It is to be understood that the shutter 4 is not limited to the configuration described above. As in a shutter 5 shown in FIG. 10A, for example, a shutter portion 5b that is connected to a base portion 5a may be formed having a downwardly convex surface. As in a shutter 6 shown in FIG. 10B, moreover, the junction of a base portion 6a and a shutter portion 6b may be formed in the shape of a cylinder to serve as a second spring portion 6d.

Figure 10A:
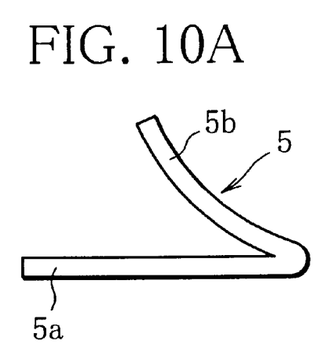
FIGS. 10A to 10D are side views individually showing modifications of the shutter used in the adapter of the invention.
Figure 10B:
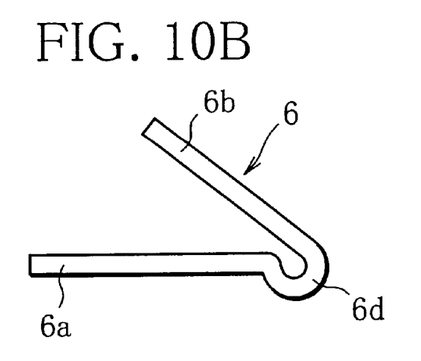
Figure 10C:
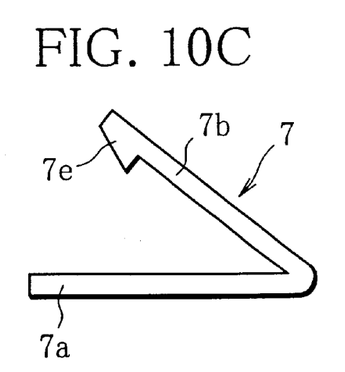
Figure 10D:
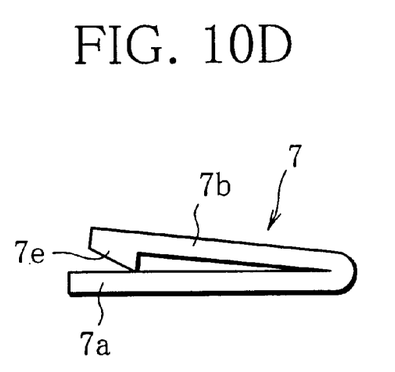

As in a shutter 7 shown in FIG. 10c, moreover, a projection 7e may be provided on the inside of the distal end of a shutter portion 7b that is connected to a base portion 7a. When the shutter portion 7b of the shutter 7 constructed in this manner is fallen down, the projection 7e prevents it from being fully shut down, as shown in FIG. 10. Thus, the shutter portion 7b can be restrained from undergoing permanent set in metal fatigue.

Figure 11:
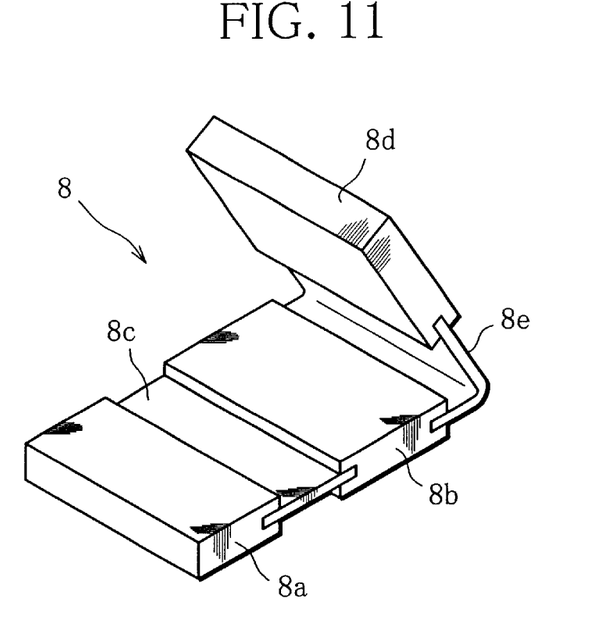
FIG. 11 is a perspective view showing another modification of the shutter used in the adapter of the invention.

As in a shutter 8 shown in FIG. 11, furthermore, base portions 8a and 8b that are formed of a synthetic resin or metal may be connected to each other by means of a leaf spring 8c that serves as a first spring portion. In this case, a shutter portion 8d and the base portion 8b are connected by means of a wedge-shaped leaf spring 8e that serves as a second spring portion.

Figure 12:
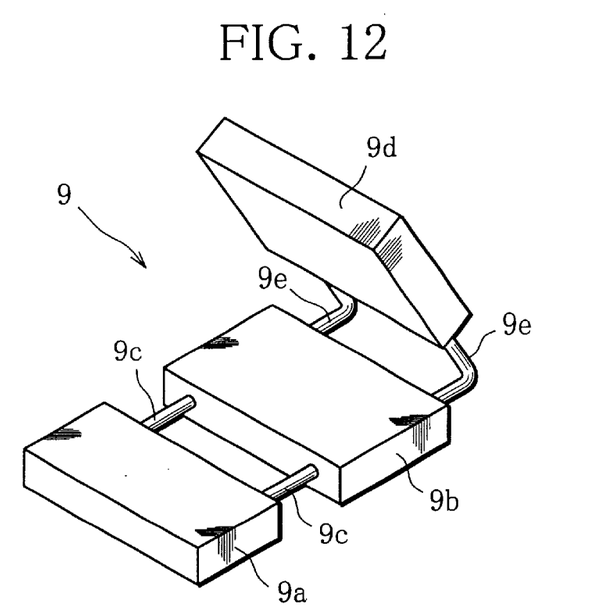
FIG. 12 is a perspective view showing still another modification of the shutter used in the adapter of the invention.

As in a shutter 9 shown in FIG. 12, on the other hand, base portions 9a and 9b may be connected to each other by means of two wire springs 9c that constitute a first spring portion. In this case, a shutter portion 9d and the base portion 8b are connected by means of two wedge-shaped wire springs 9e that constitute a second spring portion.

A synthetic resin or metal may be used as a material for the shutter and base portions of the shutters 8 and 9. Further, a superelastic metal such as nickel-titanium alloy may be used as a material for the leaf springs and wire springs.

Although the optical connector having optical fibers has been described as the plug to be connected to the connector adapter of the foregoing embodiment, it is to be understood that the present invention may be also applied to a connector that uses optical fibers and electric wires as transmission means and singly includes both optical and electrical junctions.

What is claimed is:

1. A connector adapter including a light emitting element for emitting a laser beam and connected with a plug having an optical fiber, whereby the laser beam emitted from the light emitting element is introduced into the optical fiber, comprising:

a shutter member fixed in a connector and including a base portion having a first spring portion and a shutter portion connected to the base portion, the base portion being adapted to undergo elastic deformation at the first spring portion so that the shutter portion recedes from the optical path of the laser beam when the plug is pushed into the adapter to be attached thereto, and adapted to be restored from the elastic deformation so that the shutter portion intercepts the optical path of the laser beam when the plug is drawn out of the adapter to be detached therefrom.

2. The connector adapter according to claim 1, further comprising a second spring portion formed at the junction of the base portion and the shutter portion.

3. The connector adapter according to claim 1, further comprising a recess capable of holding a part of the shutter member when the plug is attached to the connector adapter.

4. The connector adapter according to claim 2, further comprising a recess capable of holding a part of the shutter member when the plug is attached to the connector adapter.

5. The connector adapter according to claim 1, further comprising an opening capable of holding a part of the shutter member when the plug is attached to the connector adapter.

6. The connector adapter according to claim 2, further comprising an opening capable of holding a part of the shutter member when the plug is attached to the connector adapter.

* * * * *